US006933640B2

(12) United States Patent
Schurter et al.

(10) Patent No.: US 6,933,640 B2
(45) Date of Patent: Aug. 23, 2005

(54) ELECTRIC MACHINE AND METHOD OF ASSEMBLING THE SAME

(75) Inventors: Robert M. Schurter, Colgate, WI (US); Charles J. Bishop, Grafton, WI (US); Alan E. Lesak, Franklin, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/687,490

(22) Filed: Oct. 16, 2003

(65) Prior Publication Data

US 2005/0082921 A1 Apr. 21, 2005

(51) Int. Cl.⁷ ............................................. H02K 5/00
(52) U.S. Cl. ............................ 310/85; 310/89; 29/596
(58) Field of Search ........................ 310/85, 89; 29/596

(56) References Cited

U.S. PATENT DOCUMENTS

| | | | | |
|---|---|---|---|---|
| 3,916,232 A | * | 10/1975 | Barone | 310/63 |
| 3,961,416 A | | 6/1976 | Otto | |
| 4,186,319 A | | 1/1980 | Dochterman | |
| 4,384,224 A | | 5/1983 | Spitler et al. | |
| 4,473,764 A | | 9/1984 | White | |
| 4,480,378 A | | 11/1984 | White et al. | |
| 4,498,230 A | * | 2/1985 | Harris et al. | 29/597 |
| 4,521,953 A | | 6/1985 | King et al. | |
| 4,549,346 A | | 10/1985 | White | |
| 4,557,041 A | | 12/1985 | White et al. | |
| 4,603,273 A | | 7/1986 | McDonald | |
| 4,705,974 A | | 11/1987 | White | |
| 4,710,657 A | * | 12/1987 | Ocken et al. | 310/62 |
| 4,712,292 A | | 12/1987 | King | |
| 4,746,828 A | * | 5/1988 | Nado et al. | 310/90 |
| 4,801,831 A | | 1/1989 | Lewis | |
| 4,862,581 A | * | 9/1989 | Royer | 29/596 |
| 4,882,832 A | * | 11/1989 | Lewis | 29/596 |
| 4,972,113 A | | 11/1990 | Newberg | |
| 4,980,595 A | * | 12/1990 | Arora | 310/263 |
| 5,006,744 A | * | 4/1991 | Archer et al. | 310/89 |
| 5,008,572 A | * | 4/1991 | Marshall et al. | 310/45 |
| 5,019,735 A | | 5/1991 | Lee | |
| 5,076,762 A | | 12/1991 | Lykes et al. | |
| 5,182,848 A | * | 2/1993 | Wheeler | 29/596 |
| 5,184,041 A | * | 2/1993 | Baer et al. | 310/239 |
| 5,245,237 A | | 9/1993 | Fisher et al. | |
| 5,430,338 A | | 7/1995 | McMillan et al. | |
| 5,475,275 A | | 12/1995 | Dohogne et al. | |
| 5,610,461 A | | 3/1997 | Dohogne et al. | |
| 5,783,892 A | | 7/1998 | Kanzaki et al. | |
| 6,040,645 A | | 3/2000 | Lynch | |
| 6,091,177 A | | 7/2000 | Carbonell et al. | |
| 6,130,493 A | | 10/2000 | Nitschke et al. | |
| 6,133,668 A | | 10/2000 | Huang et al. | |
| 6,169,345 B1 | | 1/2001 | Bloch et al. | |
| 6,223,416 B1 | * | 5/2001 | Boyd et al. | 29/596 |
| 6,278,206 B1 | * | 8/2001 | Yockey et al. | 310/71 |
| 6,589,018 B2 | * | 7/2003 | Chen | 417/14 |

FOREIGN PATENT DOCUMENTS

| | | | | |
|---|---|---|---|---|
| JP | 55013646 | | 1/1980 | |
| JP | 01055030 | | 3/1989 | |
| JP | 2002119023 A | * | 4/2002 | H02K/15/04 |

* cited by examiner

*Primary Examiner*—Joseph Waks
(74) *Attorney, Agent, or Firm*—Michael Best & Friedrich LLP

(57) ABSTRACT

An electric machine having a stator, a rotor, a first intermediate portion, an end cap, a second intermediate portion, and a second end cap. The first and second intermediate portions partially cover the stator. The electric machine further includes a fastener that couples the first and second end caps.

31 Claims, 7 Drawing Sheets

US 6,933,640 B2

ELECTRIC MACHINE AND METHOD OF ASSEMBLING THE SAME

BACKGROUND OF THE INVENTION

The invention relates to an electric machine and, more particularly, to a housing of the electric machine.

Many types of housings are used to encapsulate electric machines such as electric motors, dynamos, generators, and alternators. Exemplary housing types include a totally enclosed housing, a drip-proof housing, and an open housing. The weight of each housing tends to vary with the size of the electric machine. For example, a large electric machine tends to weigh heavier than a relatively smaller electric machine. Additionally, a heavier housing generally results in more material being used to encapsulate the electric machine. This tends to increase the overall production cost of the machine.

Many factors also affect the efficiency of an electric machine. For instance, the performance of the electric machine can be related to the housing of the electric machine. For example, when the heat generated by the electric machine during operation is not dissipated through the housing, the performance of the electric machine may degrade, thus leading to a less efficient electric machine. Other factors that affect the efficiency of an electric machine include the alignment of components in the electric machine.

SUMMARY OF THE INVENTION

Accordingly, the invention provides an electric machine including a stator and a rotor. The stator includes a stator core having a generally cylindrical surface disposed between a first end and a second end. The rotor is adapted to magnetically interact with the stator and is configured to rotate about an axis. The electric machine further includes a first intermediate portion that partially covers the generally cylindrical surface of the stator, and an end cap that is coupled to the first intermediate portion. The electric machine further includes a second intermediate portion that partially covers the stator and is spaced from the first intermediate portion. The electric machine also includes a second end cap that is coupled to the second intermediate portion, and a fastener.

The invention also provides an electric machine assembly. The electric machine assembly includes a stator and a rotor that rotates about an axis. The stator includes a stator core having a first end, a second end, and a generally cylindrical surface between the first and second ends. The electric machine assembly further includes a first housing portion that partially covers the stator. The first housing portion includes a first tab that is disposed adjacent to the first end of the stator. The electric machine assembly further includes a second housing portion that partially covers the stator. The second housing portion includes a second tab that is disposed adjacent to the second end of the stator. The electric machine assembly also includes a fastener that couples the first and second housings.

The invention also provides a method of assembling an electric machine. The method includes providing a stator having a stator core. The stator core includes a first end, a second end, and a generally cylindrical surface between the first and second ends. The method further includes fitting a first housing portion over the stator. The first housing portion is configured to include a first tab that is disposed adjacent to the first end of the stator. The method further includes fitting a second housing portion over the stator. The second housing portion is configured to include a second tab that is disposed adjacent to the second end of the stator. The method further includes coupling the first and second housing portions.

Other features of the invention will become apparent to those skilled in the art upon review of the following detailed description, claims, and drawings.

DETAILED DESCRIPTION OF THE PREFERRED EMBODIMENT

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Figure 1:
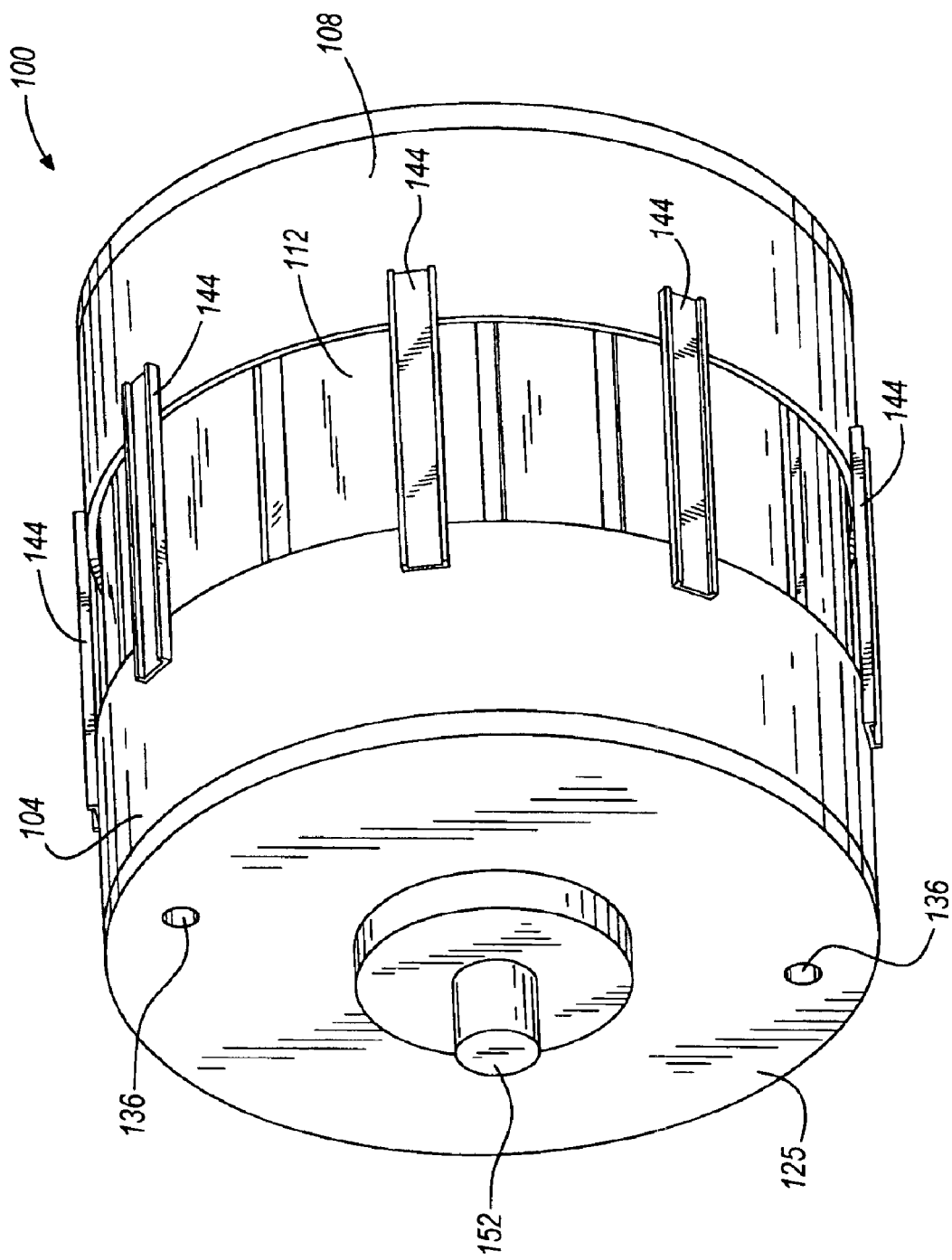
FIG. 1 shows a perspective view of an electric machine embodying the invention.
Figure 2:
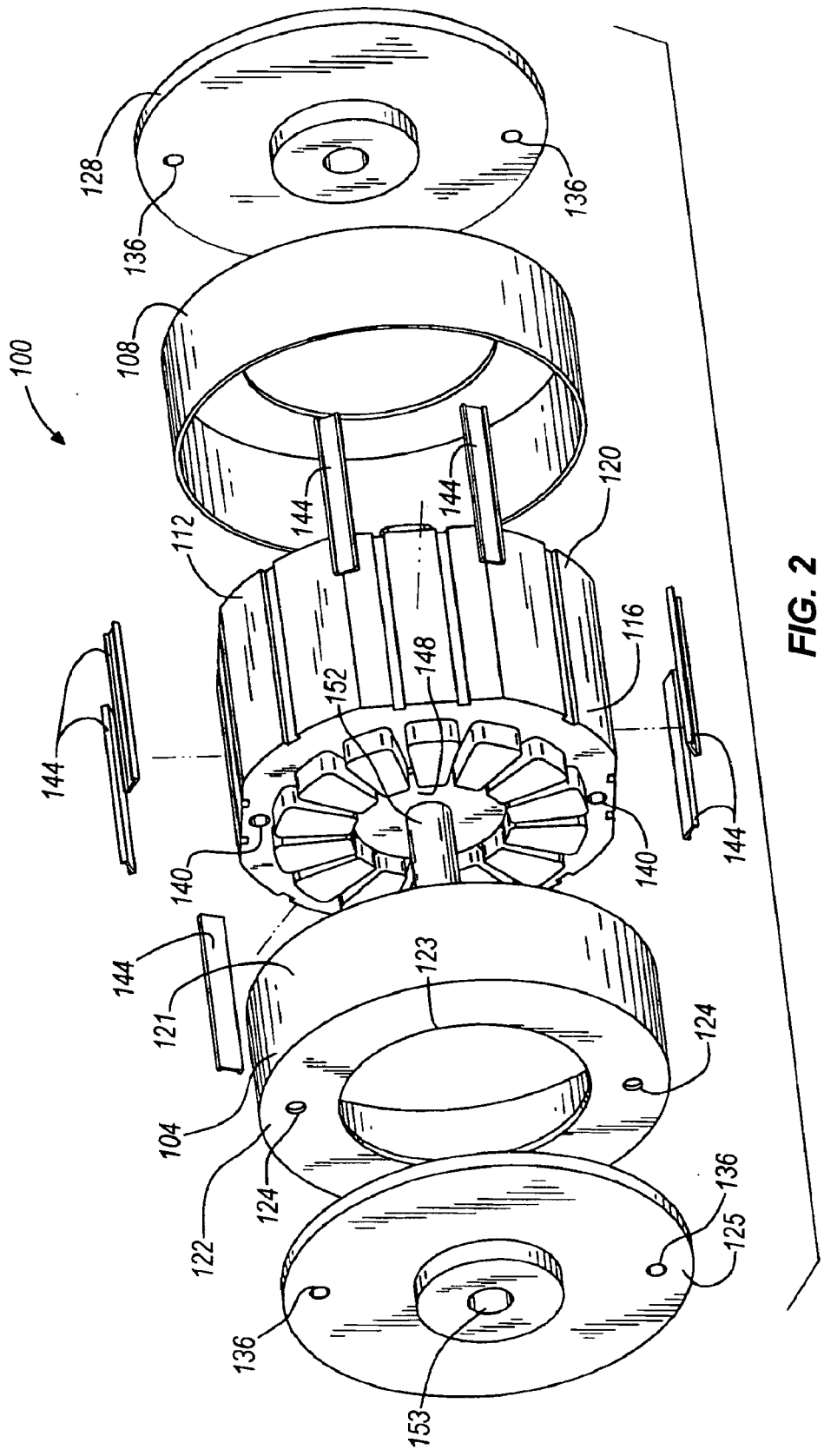
FIG. 2 shows a partially exploded view of the electric machine shown in FIG. 1.

FIGS. 1 and 2 show an electric machine 100 embodying the invention. The electric machine 100 includes two spaced-apart housing portions 104 and 108 (which may also be referred to herein as intermediate portions), each of which press-fits over a portion of a ferromagnetic stator core 112. As shown in FIG. 2, the stator 112 has a first end portion 116 and a second end portion 120, and comprises a stator core.

The stator 112 is generally cylindrical and has a bore extending axially through the stator 112 from the first end portion 116 to the second end portion 120. For the construction shown, the stator 112 includes a plurality of laminations, each of which have an opening. The laminations are stacked so that the openings of the laminations form the bore of the stator 112. In other constructions, the stator is a solid core or a core comprising of compressed magnetic powder material.

Referring again to FIG. 2, the first end portion 116 is covered by the first housing portion 104, and the second end portion 120 is covered by the second housing portion 108. Each of the housing portions 104, 108 includes a generally cylindrical side wall 121 and a distal surface 122 (i.e., the first housing portion 104 includes a first distal surface and the second housing portion 108 includes a second distal surface). Each housing portion 104, 108 also includes a rotor shaft opening 123 and a plurality of apertures 124 disposed on the distal surface 122. End caps 125, 128, are connected to the distal surfaces 122 of the housing portions 104, 108 with a plurality of support members such as through-bolts, rivets, etc. The support members extend through clearance holes 136 in the end caps 125, the apertures 124 of the distal surfaces 122, and clearance channels or bores 140 of the stator 112. The support members then secure the end caps 125, 128 to the intermediate portions 104, 108. In another embodiment, the bore 140 of the stator 112 is a blind bore. Accordingly, the support members couple the end caps 125 via the clearance holes 136, the apertures 124, and the bores 140.

In the construction shown in FIGS. 1 and 2, other support members such as a plurality of channel straps 144 can also be used to connect the housing portions 104, 108 (e.g., via welding the straps to the housing portions). Furthermore, the channel straps 144 can also be extended, or additional straps can be used, to connect the end cap 125 to the housing portion 104, and, similarly, the end cap 128 to the housing portion 108. It is also envisioned that, when using the straps 144, the support members may not be required.

The housing portions 104 and 108 are arranged to increase the exposure of some portions of the stator 112 to the surroundings, and thus facilitating the heat dissipation of the electric machine 100. Furthermore, the overall weight of the electric machine 100 is typically reduced. In some cases, the weight of the electric machine housing can be reduced by 50% or more.

Referring back to FIGS. 1 and 2, the electric machine 100 also includes a rotor 148 rotatably positioned within the stator 112. The rotor 148 includes a rotating shaft 152 that extends through at least one of the housing portions 104, 108 and at least one of the end caps 125, 128. The electric machine further includes at least one bearing having a shaft bore 153 that receives the shaft 152.

In other constructions, the rotor and stator can be arranged in an axial airgap configuration. It is envisioned in yet other constructions that the distal surfaces 122 are not present and the end caps 125, 128 are directly coupled to the housing portions 104, 108 to form two unitary housing portions.

Figure 3:
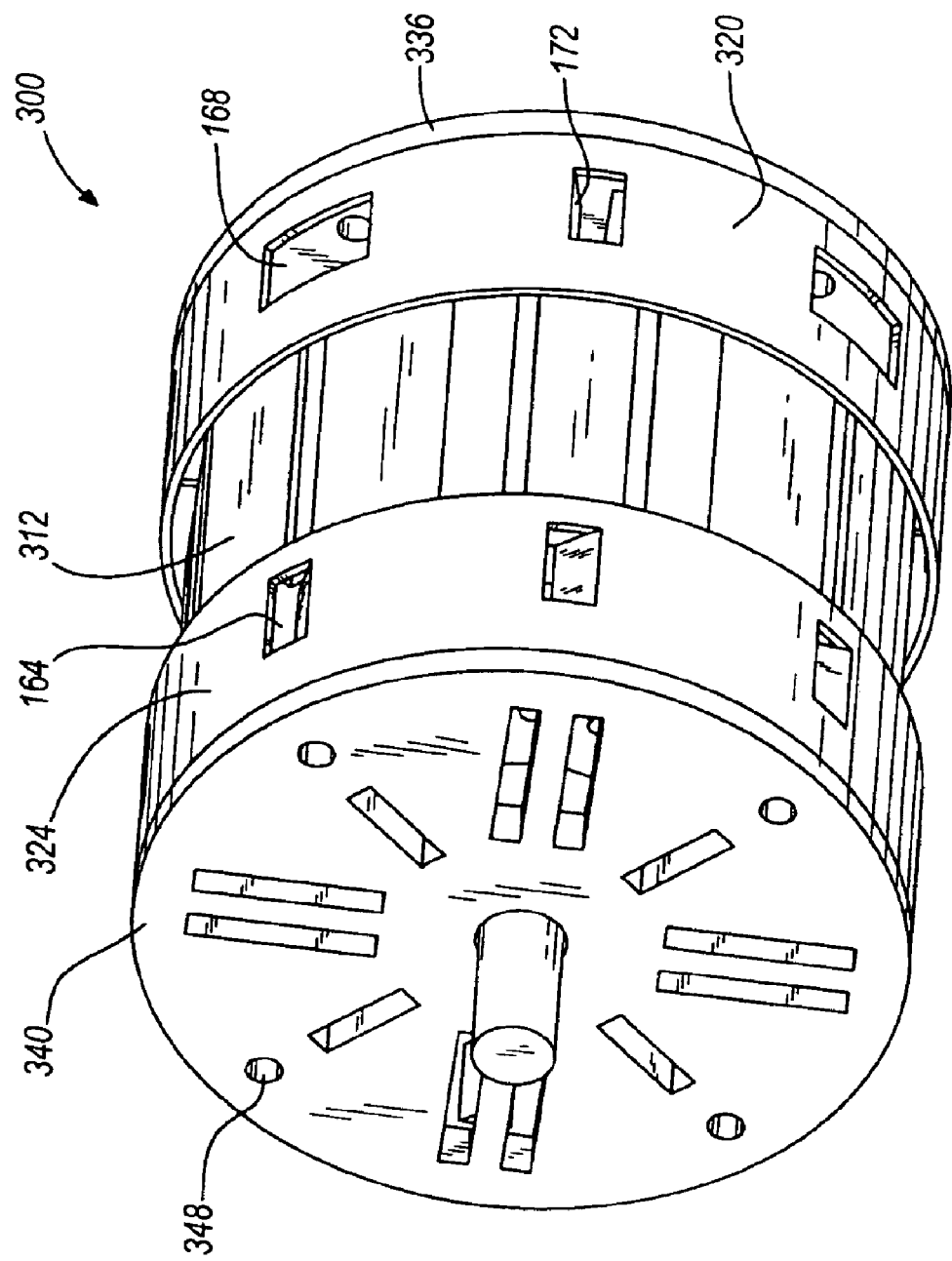
FIG. 3 shows a perspective view of a second electric machine embodying the invention.
Figure 4:
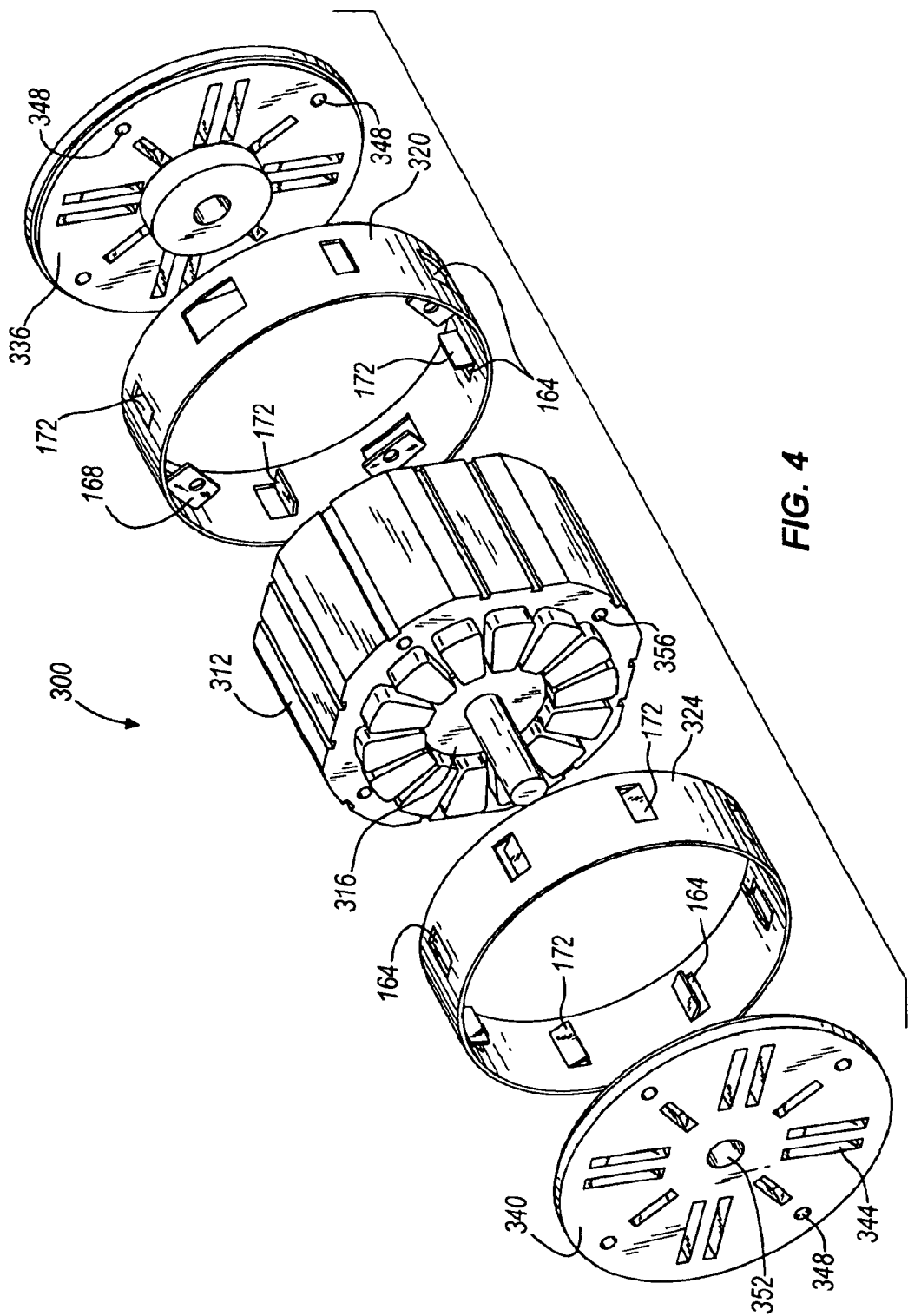
FIG. 4 shows a partially exploded view of the electric machine shown in FIG. 3.
Figure 7:
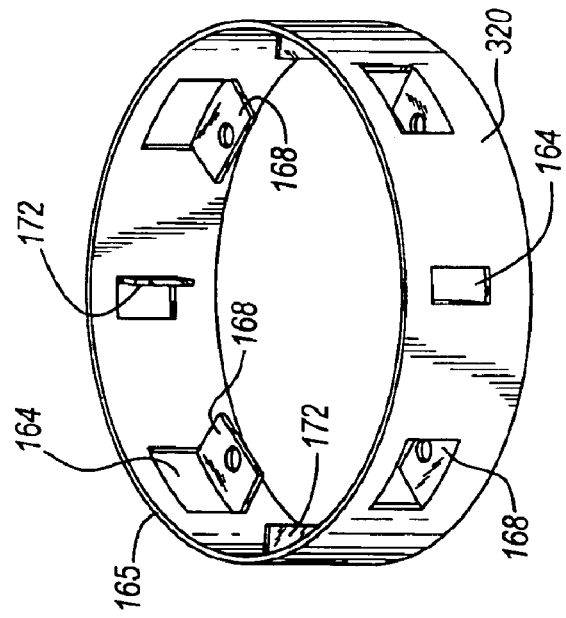
FIG. 7 shows a perspective view of the housing portion shown in FIG. 6.
Figure 5:
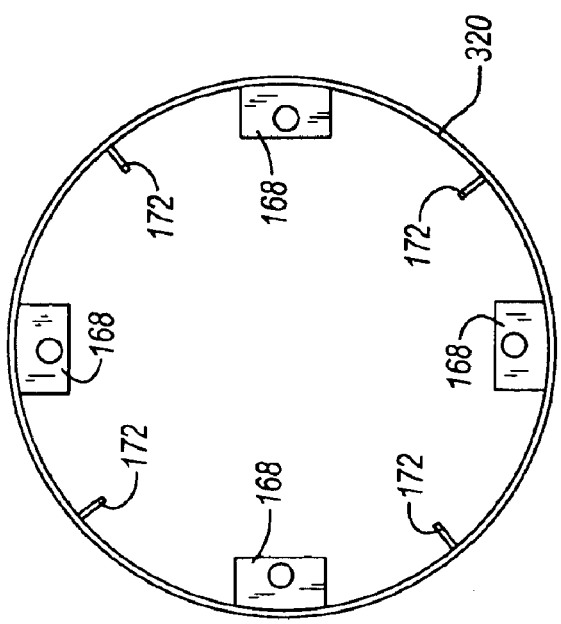
FIG. 5 shows a top view a housing portion of electric machine shown in FIG. 3.
Figure 6:
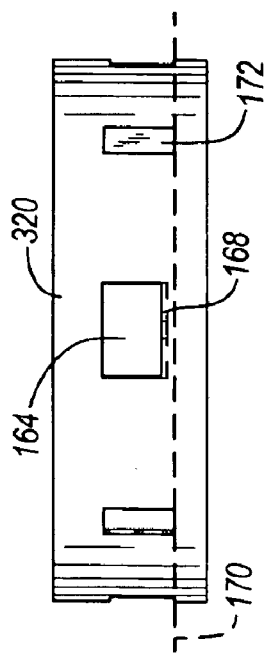
FIG. 6 shows a side view of the housing portion shown in FIG. 5.
Figure 10:
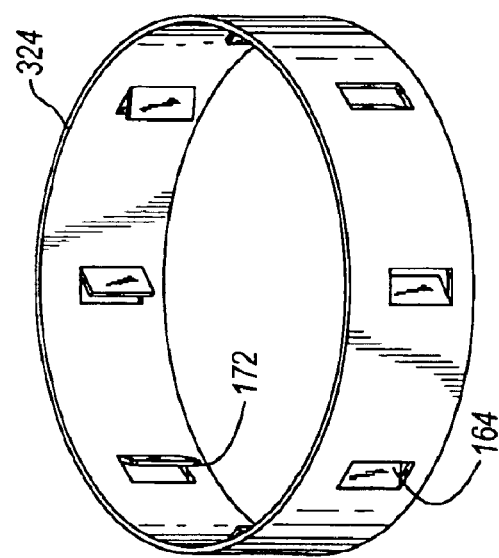
FIG. 10 shows a perspective view of the housing portion shown in FIG. 8.
Figure 9:
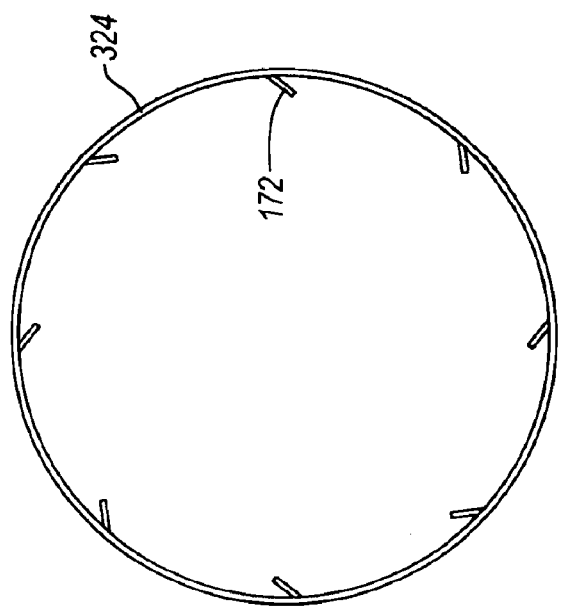
FIG. 9 shows a top view of the second housing portion shown in FIG. 8.
Figure 8:
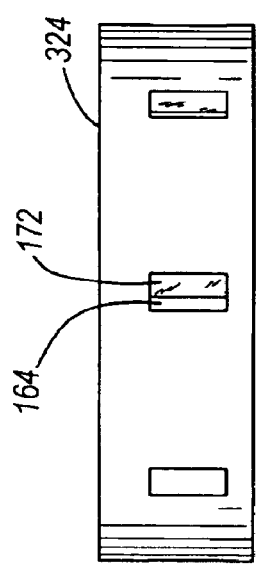
FIG. 8 shows a side view of a second housing portion of the electric machine shown in FIG. 3.

FIGS. 3 and 4 show another electric machine 300 embodying the invention. Similar to the earlier construction, the electric machine 300 includes two spaced apart-housing portions 320 and 324 (which may also be referred to herein as intermediate portions), each of which fits over a portion of a ferromagnetic stator core 312. FIGS. 5, 6, and 7 show various views of the first housing portion 320. The first housing portion 320 includes a plurality of apertures 164 disposed in a generally cylindrical wall 165 of the housing portion 320. The plurality of apertures 164 can act as airflow ports. The first housing portion 320 also indicates an interior 166. At least some of the apertures 164 have tabs of flanges 168, 172 disposed to the apertures 164. The tabs 168 (referred to herein as connecting tabs) are configured to project radially inward from the interior 166 and provide openings that can receive fasteners (e.g., through-bolts). The tabs 172 (referred to herein as positioning tabs) abut against the stator 312. In the embodiment shown in FIGS. 5, 6, and 7, the positioning tabs and the connecting tabs are alternately arranged. However, other tab combinations can be used. For example, the first housing portion 320 can include a plurality of apertures 164 with only some of the apertures having tabs. In another example, and as shown by the second housing portion 324 (FIG. 8), the housing portion 324 includes a plurality 164 with only positioning tabs 172. FIGS. 8, 9, and 10 show various views of the second housing portion 324.

In one construction, the connecting tabs 168 can be offset from the positioning tab as shown by line 170 (FIG. 6). However, in another construction, the connecting tabs 168 can also act as positioning tabs. The alternative embodiments shown in FIGS. 3–10 further expose the stator 312 to an air flow and, thus, increase the heat dissipation capability of the electric machine 300.

Referring again to FIG. 4, the electric machine 300 includes the stator and a rotor 316 disposed to interact with the stator. The stator core 312 is connected to a pair of housing portions 320 and 324. The housing portions 320 and 324 include a plurality of apertures 164, some of which result in positioning tabs 172 to abut against the stator core 312. The number of apertures 168 and positioning tabs 332 can vary depending on the structural stability desired for the electric machine 300. Also the placement of the apertures 164 can vary. Some of the remaining apertures 164 can result in connecting tabs 168 for receiving a fastener (e.g., a through hole) as discussed below.

The electric machine 300 also includes a pair of end caps 336 and 340. Each end cap 336 and 340 includes a plurality of openings 334 and aperatures 348 arranged around a rotor shaft opening 352 of a bearing. The openings 344 provide additional cooling capability to the electric machine 300. The first end cap 336 presses against the first housing portion 320 and the second end cap 340 presses against the second housing portion 324. A fastener (also referred to as a support member), such as a through bolt, couples the first and second end caps 336 and 340, thereby abutting the first end cap 336 with the first housing portion 320 and abutting the second end cap 340 with the second housing portion 324. This results in the first and second housing portions 320 and 324 abutting with the stator 312.

Figure 11:
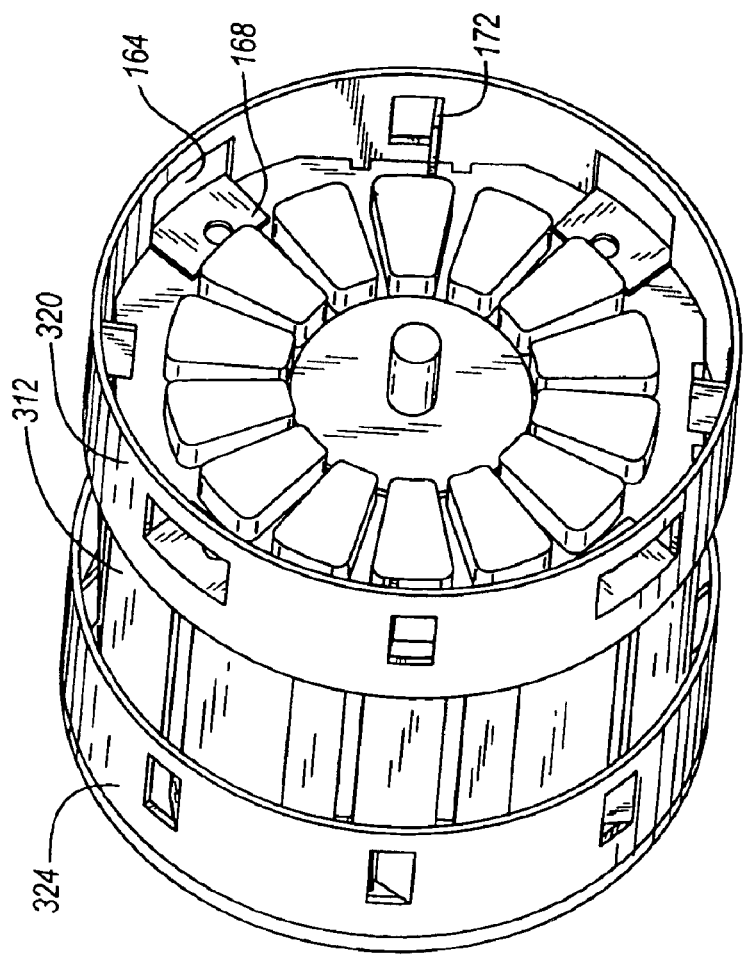
FIG. 11 shows a perspective view of the second electric machine without end caps.

FIG. 3 shows the electric machine 300 after the pair of housing portions 320 and 324 and the pair of end caps 336 and 340 have been coupled together. The end caps 340 are coupled with a plurality of fasteners via apertures 348. The positioning tabs 172 abut against the stator core 312 as best shown in FIG. 11. Although the tabs 168 and 172 are alternately arranged in the embodiment shown in FIGS. 4 and 11, one skilled in the art would appreciate that the connecting tabs 168 and the positioning tabs 172 can be arranged differently.

Figure 12:
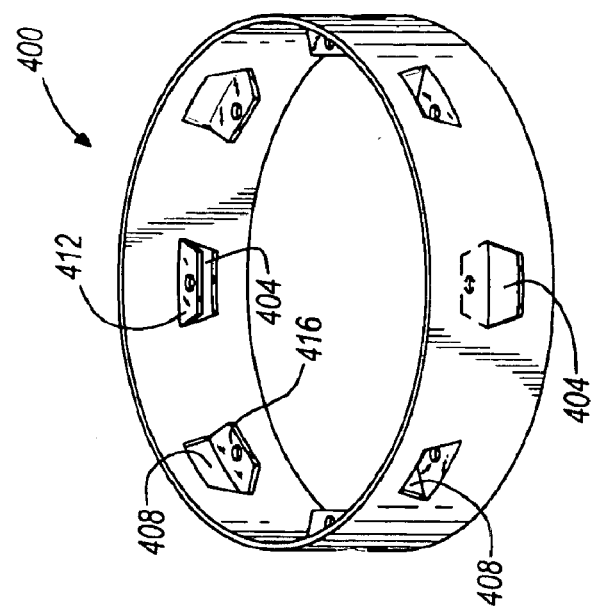
FIG. 12 shows a perspective of an alternative housing portion capable of being used with the electric machine of the invention.

The apertures 164 shown in FIGS. 3–11 are substantially rectangular shaped. However, the apertures 164 can also include other shapes such as a trapezoid or a square. In an embodiment where only the connecting tabs are used, the apertures can be arranged differently, for example as shown in FIG. 12. The alternative housing portion 400 includes two sets of apertures 404 and 408. The first set of apertures 404 is positioned substantially below a plurality of corresponding connecting tabs 412, while the second set of apertures 408 is positioned substantially above a plurality of corresponding connecting tabs 416. Furthermore, the apertures 404 and 408 are generally trapezoidal. It is also envisioned that the housing portions 320, 324 and the end caps 336, 340 can form unitary housing portions.

Various features and advantages of the invention are set forth in the following claims.

What is claimed is:

1. An electric machine comprising:
   a stator including a stator core having a generally cylindrical surface disposed between first and second ends;
   a rotor adapted to magnetically interact with the stator, the rotor rotating about an axis;
   a first intermediate portion partially covering the generally cylindrical surface of the stator;
   a first end cap coupled to the first intermediate portion;
   a second intermediate portion partially covering the generally cylindrical surface of the stator and being spaced from the first intermediate portion;
   a support member that comprises an exterior strap connecting the first intermediate portion and the second intermediate portion;
   a second end cap coupled to the second intermediate portion; and
   a fastener coupling at least one of the first and second intermediate portions and extending through the first and second end caps.

2. The electric machine of claim 1 wherein the first intermediate portion includes a first distal surface spaced from the first end of the stator, and the second intermediate portion includes a second distal surface spaced from the second end of the stator, wherein the first end cap is coupled to the first distal surface and the second end cap is coupled to the second distal surface.

3. The electric machine of claim 1 wherein each of the first and second intermediate portions are generally cylindrical.

4. The electric machine of claim 1 wherein at least one of the first and second intermediate portions include a tab.

5. The electric machine of claim 4 wherein the at least one of the first and second intermediate portions include an aperture.

6. The electric machine of claim 5 wherein the aperture is disposed adjacent to the tab.

7. The electric machine of claim 6 wherein the tab is disposed adjacent to one of the ends of the stator.

8. The electric machine of claim 5 wherein the tab is formed by punching the at least one of the first and second intermediate portions to create the aperture.

9. The electric machine of claim 4 wherein the tab includes an aperture.

10. An electric machine comprising:
    a stator including a stator core having a generally cylindrical surface disposed between first and second ends;
    a rotor adapted to magnetically interact with the stator, the rotor rotating about an axis;
    a first intermediate portion partially covering the generally cylindrical surface of the stator;
    a first end cap coupled to the first intermediate portion;
    a second intermediate portion partially covering the generally cylindrical surface of the stator and being spaced from the first intermediate portion;
    a second end cap coupled to the second intermediate portion; and
    a fastener coupling at least one of the first and second intermediate portions and the first and second end caps, wherein at least one of the first and second intermediate portions include a tab and the tab includes an aperture, and wherein the electric machine further includes a fastener to couple the first and second end caps, and wherein the fastener is disposed within the aperture.

11. The electric machine of claim 10 wherein the core includes a bore, and wherein the fastener is disposed within the bore of the core.

12. An electric machine assembly comprising:
    a stator including a stator core, the stator core including first and second ends and a generally cylindrical surface between the first and second ends;
    a rotor adapted to magnetically interact with the stator, the rotor rotating about an axis;
    a first housing portion partially covering the generally cylindrical surface of the stator, the first housing portion including a first tab disposed adjacent to the first end of the stator and projecting from a first housing interior;
    a second housing portion partially covering the generally cylindrical surface of the stator, the second housing portion including a second tab disposed adjacent to the second end of the stator and projecting from a second housing interior; and
    a fastener coupling the first and second housing portions.

13. The electric machine assembly of claim 12 wherein the machine further comprises a first end cap to the first housing portion and a second end cap coupled to the second housing portion and wherein the fastener couples the first and second end caps.

14. The electric machine of claim 13 wherein the first housing portion includes a first distal surface spaced from the first housing portion of the stator, and the second housing portion includes a second distal surface spaced from the second housing portion of the stator, and wherein the first end cap is coupled to the first distal surface and the second end cap is coupled to the second distal surface.

15. The electric machine of claim 12 wherein the at least one of the housing portion includes an aperture.

16. The electric machine of claim 15 wherein the aperture is disposed adjacent to the first tab.

17. The electric machine of claim 16 wherein the tab is disposed adjacent to one of the ends of the stator.

18. The electric machine of claim 12 wherein the tab is formed by punching the first housing portion to create the aperture.

19. The electric machine of claim 12 wherein the tab includes an aperture.

20. The electric machine of claim 12 wherein each of the first and second housing portions are generally cylindrical.

21. The electrical machine assembly of claim 12 wherein the stator comprises at least one bore, and wherein the electric machine further comprises fasteners coupling the housing portions via the bore.

22. The electric machine assembly of claim 21 wherein the first tab comprises a connecting tab.

23. An electric machine assembly comprising:
    a stator including a stator core, the stator core including first and second ends and a generally cylindrical surface between the first and second ends;
    a rotor adapted to magnetically interact with the stator, the rotor rotating about an axis;

a first housing portion partially covering the generally cylindrical surface of the stator, the first housing portion including a first tab disposed adjacent to the first end of the stator;

a second housing portion partially covering the generally cylindrical surface of the stator, the second housing portion including a second tab disposed adjacent to the second end of the stator; and a fastener coupling the first and second housing portions, wherein the first tab comprises a positioning tab abutting against the stator.

24. A method of assembling an electric machine, the method comprising:

providing a stator including a stator core, the stator core including first and second ends and a generally cylindrical surface between the first and second ends;

fitting a first housing portion over the stator, the first housing portion including a first tab extending from a first housing interior, the first fitting act including partially covering the generally cylindrical surface with the first housing portion and disposing the first tab adjacent to the first end of the stator;

fitting a second housing portion over the stator, the second housing portion including a second tab extending from a second housing interior, the second fitting act including partially covering the generally cylindrical surface with the second housing portion and disposing the second tab adjacent to the second end of the stator; and coupling the first and second housing portions.

25. The method of claim 24 and further comprising disposing a first end cap adjacent to the first housing portion, and disposing a second end cap adjacent to the second housing portion.

26. The method of claim 25 wherein coupling the first and second housing portions results from coupling the first and second end caps with a fastener.

27. A method of assembling an electric machine, the method comprising:

providing a stator including a stator core, the stator core including first and second ends and a generally cylindrical surface between the first and second ends;

fitting a first housing portion over the stator, the first housing portion including a first tab, the first fitting act including partially covering the generally cylindrical surface with the first housing portion and disposing the first tab adjacent to the first end of the stator;

fitting a second housing portion over the stator, the second housing portion including a second tab, the second fitting act including partially covering the generally cylindrical surface with the second housing portion and disposing the second tab adjacent to the second end of the stator;

coupling the first and second housing portions; and abutting the tab against the stator.

28. A method of assembling an electric machine, the method comprising:

providing a stator including a stator core, the stator core including first and second ends and a generally cylindrical surface between the first and second ends;

fitting a first housing portion over the stator, the first housing portion including a first tab, the first fitting act including partially covering the generally cylindrical surface with the first housing portion and disposing the first tab adjacent to the first end of the stator;

fitting a second housing portion over the stator, the second housing portion including a second tab, the second fitting act including partially covering the generally cylindrical surface with the second housing portion and disposing the second tab adjacent to the second end of the stator;

coupling the first and second housing portions; and punching a first aperture to create the first tab.

29. The method of claim 28 and further comprising punching a second aperture adjacent to create the second tab.

30. A method of assembling an electric machine, the method comprising:

providing a stator including a stator core, the stator core including first and second ends and a generally cylindrical surface between the first and second ends;

fitting a first intermediate portion over the stator, the first intermediary portion including a first tab, the first fitting act including partially covering the generally cylindrical surface with the first intermediate portion and disposing the first tab adjacent to the first end of the stator;

fitting a second intermediate portion over the stator, the second intermediate portion including a second tab, the second fitting act including partially covering the generally cylindrical surface with the second intermediate portion and disposing the second tab adjacent to the second end of the stator;

disposing a first end-cap adjacent to the first intermediate portion;

disposing a second end-cap adjacent to the second intermediate portion; and coupling the first and second end caps; and punching a first aperture to create the first tab.

31. The method of claim 30 and further comprising punching a second aperture adjacent to create the second tab.

* * * * *